United States Patent
Bayer et al.

(10) Patent No.: US 8,002,162 B2
(45) Date of Patent: Aug. 23, 2011

(54) FRICTION-WELDING DEVICE

(75) Inventors: Erwin Bayer, Dachau (DE); Boris Grohmann, Taufkirchen (DE); Frank Hermle, Aying (DE); Peter Jaenker, Riemerling (DE)

(73) Assignee: MTU Aero Engines GmbH, Munich (DE)

( * ) Notice: Subject to any disclaimer, the term of this patent is extended or adjusted under 35 U.S.C. 154(b) by 1372 days.

(21) Appl. No.: 10/538,519

(22) PCT Filed: Nov. 26, 2003

(86) PCT No.: PCT/DE03/03920
§ 371 (c)(1),
(2), (4) Date: Nov. 7, 2005

(87) PCT Pub. No.: WO2004/058443
PCT Pub. Date: Jul. 15, 2004

(65) Prior Publication Data
US 2006/0231593 A1 Oct. 19, 2006

(30) Foreign Application Priority Data

Dec. 21, 2002 (DE) .................. 102 60 465

(51) Int. Cl.
*B23K 20/12* (2006.01)
(52) U.S. Cl. ............ 228/2.1; 228/110.1; 228/262.1; 228/112.1; 310/323.01; 310/311
(58) Field of Classification Search .......... 228/110.1, 228/262, 1.1, 112.1, 2.1; 310/323.01, 311; 311/116 R
See application file for complete search history.

(56) References Cited

U.S. PATENT DOCUMENTS

| 6,299,051 | B1 * | 10/2001 | Tsujino ............ 228/110.1 |
| 6,326,717 | B1 * | 12/2001 | Mattes ............ 310/328 |
| 6,617,766 | B1 * | 9/2003 | Stoecklein et al. ...... 310/346 |
| 2003/0086748 | A1 * | 5/2003 | Culpepper ............ 403/13 |

FOREIGN PATENT DOCUMENTS

| EP | 0 290 134 | 11/1988 |
| EP | 0 513 669 | 11/1992 |
| EP | 0 718 069 A1 | 6/1996 |

OTHER PUBLICATIONS

Merriam-Webster online dictionary. www.merriam-webster.com, 2009.*

* cited by examiner

*Primary Examiner* — Jessica L Ward
*Assistant Examiner* — Erin B Saad
(74) *Attorney, Agent, or Firm* — Kenyon & Kenyon LLP

(57) ABSTRACT

A friction-welding device for the integral joining of components, having an oscillator, which generates a periodic movement of a component and a welding surface provided thereon relative to another, static component and a welding surface provided thereon, with directions of movement parallel to the welding surfaces, having a compression device which presses the welding surfaces together, and a cartridge which accommodates the moved component. The oscillator includes two or a greater, even number of piezoactuators, which are arranged in pairs on a line of application and are able to be prestressed with respect to the cartridge from opposite sides under pressure generation and are able to be moved in a synchronous, oscillating manner together therewith and the component.

12 Claims, 3 Drawing Sheets

FRICTION-WELDING DEVICE

FIELD OF THE INVENTION

The present invention relates to a friction-welding device for the integral joining of components.

BACKGROUND INFORMATION

Certain friction-welding devices are conventional. One distinguishing criterion is the utilized kinematical principle. In the case at hand, devices are involved in which one of two components to be joined is held statically, the other is moved in an oscillating manner, i.e., periodically moved back and forth, and is pressed against the static component in the process. The periodic movement occurs parallel to the provided welding surfaces and is generated by a so-called oscillator. The pressing occurs perpendicular to the welding surfaces with the aid of a suitable compression device. Due to the high compression and friction forces, the usually smaller, moved component is retained in a sturdy cartridge that leaves only the welding zone accessible in most cases. The oscillatory movement may be implemented on a straight and/or curved path, for instance on a portion of a circular arc. In the straight-line variant, the designation "linear friction welding", abbreviated LFW, is often used. In view of the high dynamic stresses, all elements of a friction-welding device must be designed as especially robust and dimensionally stable elements which are free from play, which applies especially when larger components made of high-strength metals are welded. Also important are precise, reproducible and variable friction and compression movements with high positioning accuracy at the end of the dynamic friction process. All of these criteria, after years of development, have had the result that mechanical and hydraulic variants as well as combinations of the two have become accepted for the direct generation of the required forces and motions. It is understood that the corresponding drives also include electromotors, electronic open-loop and closed-loop controls, i.e., electrical and electronic elements.

European Published Patent Application No. 0 513 669 describes a friction-welding method for the blading of a blade carrier for turbo engines together with the required device and device elements. The actual implementation of this friction-welding device operates with the aid of an electromotorically driven, mechanical oscillator according to an eccentric principle, as well as with an electro-hydraulic, pressurized hydraulic compression device.

In mechanical oscillators the maximum movement frequency is limited to values below 100 Hertz (Hz). In hydraulic oscillators the maximum frequency is above 100 Hz but still below 150 Hz. According to the equation power—force× velocity, the friction power is proportional to the friction force, the movement amplitude and the movement frequency. The friction force results from the normal force and the coefficient of friction. At a predefined amplitude, predefined frequency (cf. above maximum values) and predefined coefficient of friction, the friction power can be increased or influenced only via the normal force/pressure force. At a predefined friction power, the relative low frequencies of the mechanical and hydraulic oscillators result in correspondingly high contact pressures that have to be generated by the compression device. High forces require mechanically especially robust and massive, i.e., heavy, components for the friction-welding device.

SUMMARY

An example embodiment of the present invention may provide a friction-welding device for the integral joining of components having periodic movement of one component, which may yield geometrically more precise integral components as a result of more precise and better reproducible function, and which may allow the manufacture of more filigreed constructions due to higher movement frequencies and lower friction power, lighter and smaller, space-saving device elements being utilizable in the welding area.

According to an example embodiment of the present invention, the oscillator may include two or a higher, even number of piezoactuators, which are arranged in pairs at least approximately on a line of application. The piezoactuators exert compressive forces from opposite sides on the cartridge having the moved component, so that a defined prestressing is able to be realized, and the periodic friction movement occurs practically without play. Via the electric voltage control/regulation of the piezoactuators with the possibility of acting on each actuator individually, it is possible to select the mechanical prestressing of the cartridge, the movement frequency, the movement amplitude, and the zero position of the movement, including the final position at the end of the welding operation, very precisely and in a reproducible manner. The requirement of complicated refinishing to compensate for geometrical inaccuracies of the welded unit, for instance by NC milling, may thereby be considerably reduced or eliminated. Due to the lower frictional forces, a smaller and lighter cartridge etc., it is also possible to use friction welding to produce and repair filigreed, mechanically sensitive blisks (bladed disks) with narrowly positioned blades. In the process, the hubs/disks of the rotors may be able to be optimally adapted to the operating loads and for the most part be fully finished, so that they may no longer have to be provided in oversize or with considerable allowances in view of the friction-welding loads, such allowances having to be removed again later on. Example embodiments of the present invention are explained in greater detail below with reference to the appended Figures.

DETAILED DESCRIPTION

Figure 1:
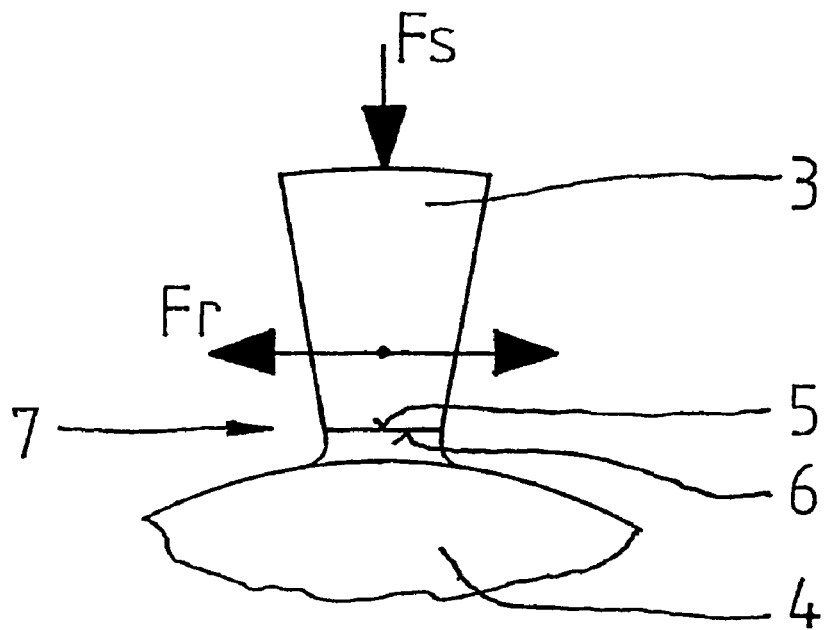
FIG. 1 illustrates the axial detail of a blade carrier having a blade to be affixed thereon.

FIG. 1, in an axial view, illustrates a portion of a blade carrier 4 intended for a rotor of a turbo engine on which a blade 3 is to be affixed by friction welding. The oscillating friction movement is to occur transversely to the longitudinal center axis of blade carrier 4, which is indicated by a horizontal double arrow for friction force Fr. Only blade 3 is moved in the process. Blade carrier 4 is held statically. Welding surfaces 5, 6 are pressed against each other by a compression force Fs directed perpendicular to the surfaces, compression force Fs being introduced into welding zone 7 via moved blade 3. The force arrow pointing toward the blade tip from above is irrelevant for the actual type of force application into blade 3. To be preferred, for example, is a force application producing an even loading, if possible, of a large portion of the blade surface by a frictionally engaged or a keyed connection.

Figure 2:
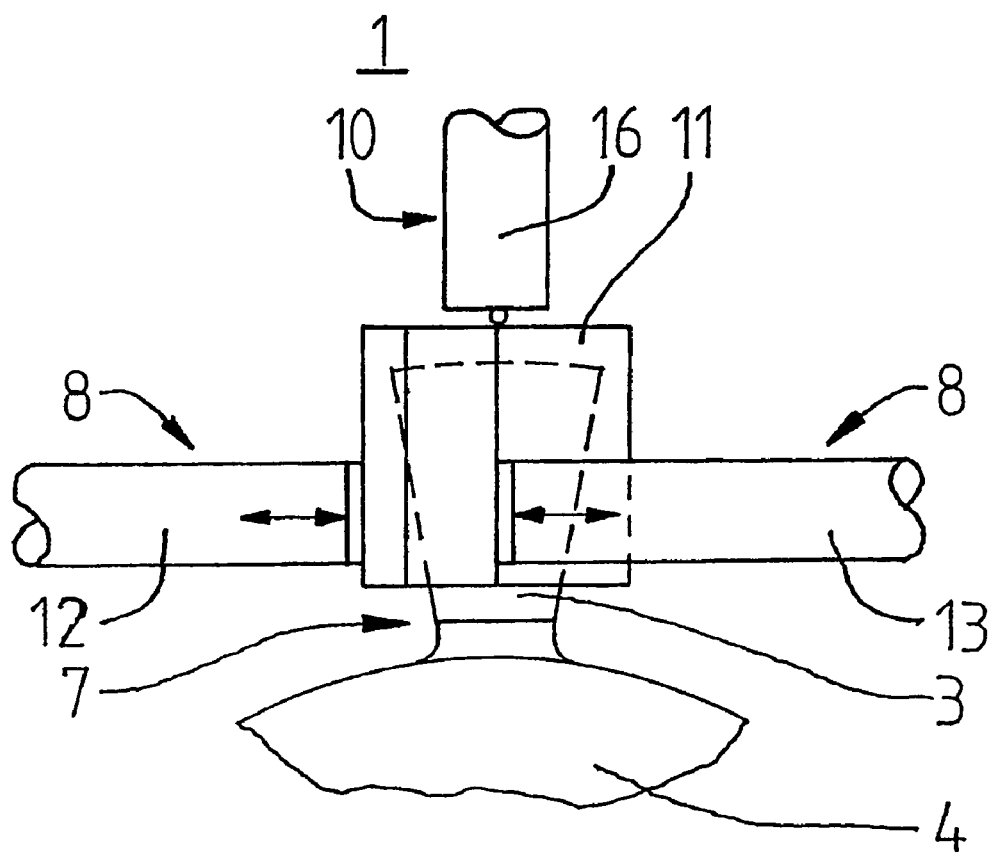
FIG. 2 illustrates the detail illustrated in FIG. 1, supplemented by a friction-welding device.

In addition to components 3, 4 to be friction-welded, FIG. 2 illustrates a friction-welding device 1 according to an example embodiment of the present invention. For better understanding, FIG. 3 should be referred to as well. To transmit the considerable forces, blade 3 is virtually completely encased in a mechanically sturdy cartridge 11, e.g., made of steel or hard metal, the inner contour of cartridge 11 being adapted to the blade contour in a best-possible manner. Cartridge 11 includes two or more parts which are screwed together and have separating lines that are adapted to the blade geometry. In addition to cartridge 11, oscillator 8, which generates a defined, periodic friction movement parallel to welding surfaces 5, 6, and compression device 10, which produces a defined compression force and feed movement, are components of friction-welding device 1. In the present example embodiment, both oscillator 8 and compression device 10 operate according to the piezoelectrical principle, i.e., on the basis of linear deformation of the piezoelements caused by electric direct voltage. Illustrated in FIG. 1 are two horizontal piezoactuators 12, 13 of oscillator 8, which are on a line of application and engage with cartridge 11 from the left and right, as well as a piezoactuator 16 of compression device 10, which engages with cartridge 11 vertically from above. The force-transmission points between the piezoactuators and cartridge 11 may have one or more degrees of freedom, depending on the relative movement, for instance for translatory displacements and/or swiveling motions. Slide bearings and/or roller bearings may be used in this context. In the case at hand, for instance, a pivoting joint with a degree of freedom may be arranged between piezoactuator 16 and cartridge 11. The implementation of the force-transmission points may be conventional. The drawn-in double arrows indicate a synchronous, equidirectional motion of piezoactuators 12 and 13.

Figure 3:
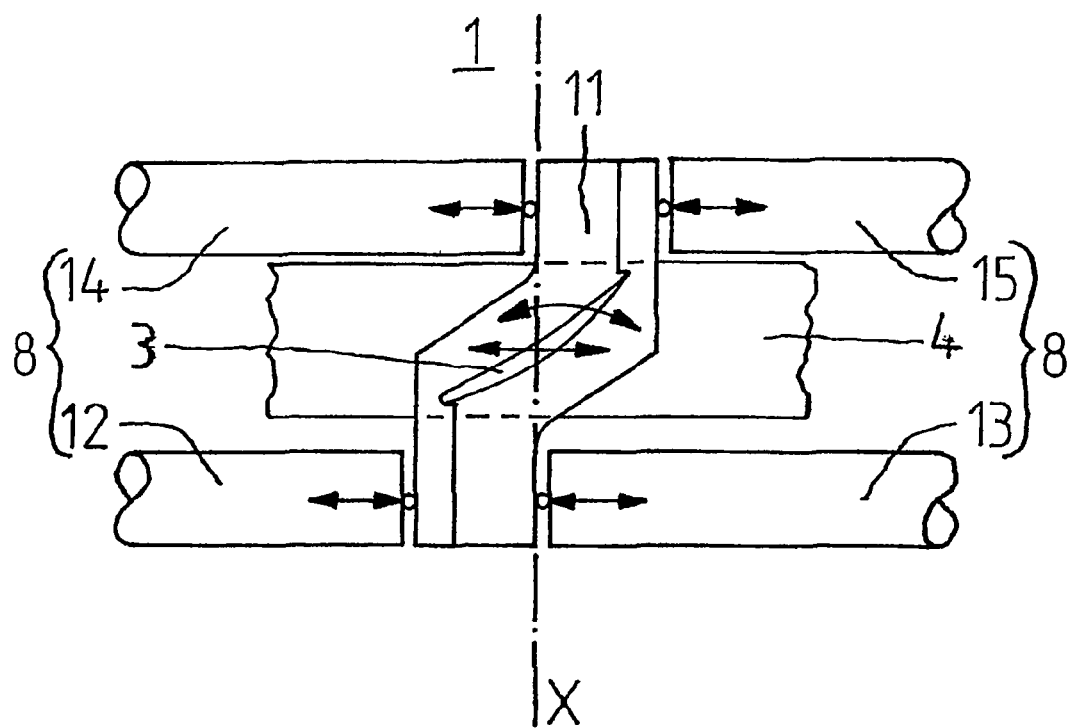
FIG. 3 illustrates the radial detail of the blade carrier, the blade and the friction-welding device illustrated in FIG. 2.

Aspects hereof become even more apparent with reference to FIG. 3. This radial detail of blade carrier 4 and blade 3 indicates the blade profile encased by cartridge 11 and the separating lines of cartridge 11 adapted thereto. Longitudinal center axis X of the blade carrier, i.e., its later axis of rotation, extends vertically in this view. It should be understood that, in a new blading of blade carrier 4, a multitude of blades 3 positioned in close proximity to one another must be affixed at the circumference, only one of which is illustrated for clarity. As a result, cartridge 11 may have to be arranged such that there is room for it between already installed blades. This is the explanation for the offset form of the cartridge illustrated. In the case at hand, oscillator 8 has four piezoactuators 12 to 15, which are arranged in pairs on a line of application and are situated transversely to longitudinal center axis X. It should be noted that the piezoactuators may have lengths of several meters due to the required oscillation amplitudes of several millimeters, a multitude of piezoelements being geometrically connected in series, i.e., are arranged one after the other. Therefore, it is possible to arrange the long piezoactuators 12 to 15 in the manner illustrated, in pairs, axially in front and behind the bladed, or to be bladed, blade carrier 4. It should be noted that friction-welding device 1 may be used both for the production of new parts and for repair purposes (repair), i.e., for the replacement of individual or several blades. The two front piezoactuators 12, 13 are synchronously controlled such that they may always rest against cartridge 11 under compressive stress. The same applies to the two rear piezoactuators 14 and 15. Also, it may be likely that the front actuator pair is operated at the same frequency as the rear actuator pair. Given an in-phase condition and identical amplitude of the front and rear actuator pair, blade 3 executes a straight oscillating motion. However, there are also the options of operating an actuator pair at different amplitude and/or with a phase shift relative to the other, yet at the same frequency. For blade 3 that means that combinations of translatory motions and swiveling motions or pure swiveling motions about variable pivotal points are possible. In this context, reference is made to the straight and the curved double arrow above blade 3. This may require a correspondingly flexible connection of piezoactuators 12 to 15 to cartridge 11. Using locally different forms of movement and different amplitudes, the introduced friction energy may be varied across the welding surfaces, for instance, less friction energy in thin blade regions than in thick regions, so that an even temperature distribution and, ultimately, a better welding result may be achieved.

Figure 4:
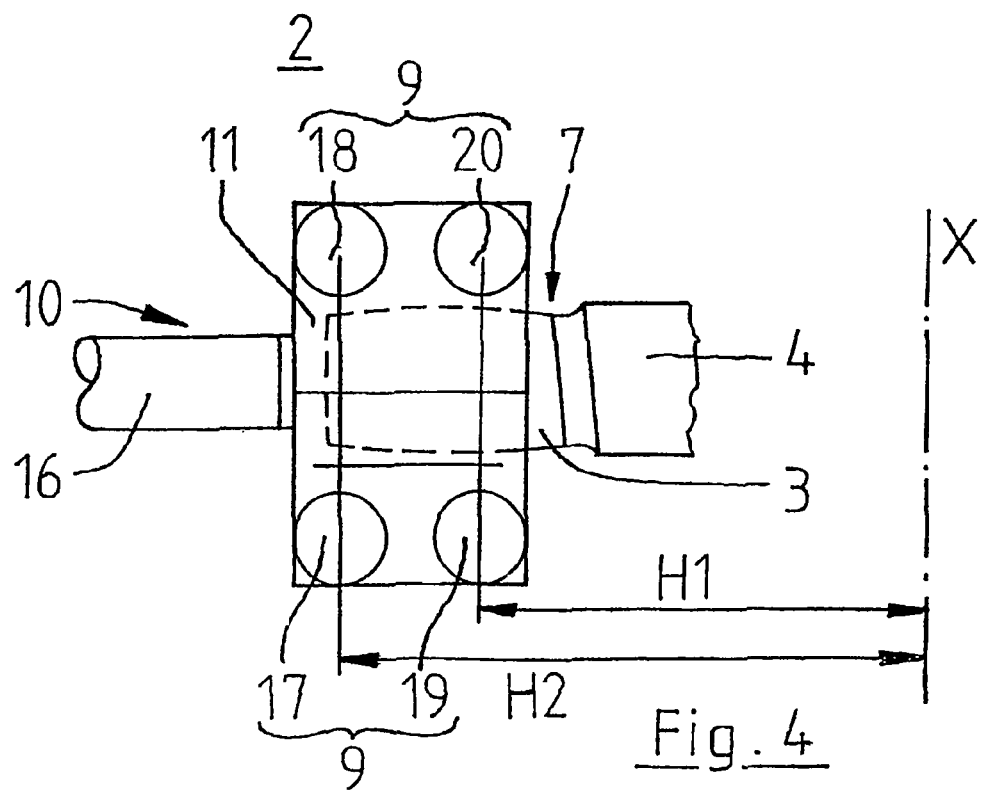
FIG. 4 illustrates the tangential detail of a blade carrier, a blade and a friction-welding device having four pairs of actuators.

FIG. 4 illustrates a detail of blade carrier 4 with blade 3 in the circumferential direction/tangential direction, longitudinal center axis X of blade carrier 4 extending vertically and to the right next to the actual representation. Friction-welding device 2 utilized here differs from the above-described friction-welding device 1 in that its oscillator 9 includes four pairs of piezoactuators, i.e., eight piezoactuators, the representation showing only the four piezoactuators 17 to 20, which are arranged in front of cartridge 11 in the view. Relative to longitudinal center axis X, the effective plane of piezoactuators 17, 18 is at a greater radial height H2 than the effective plane of piezoactuators 19, 20, which is at radial height H1. Blades may exhibit a slight, undesired tilt in the circumferential direction after welding despite precise radial alignment in the cartridge. Utilizing the illustrated, height-offset actuator pairs may make it possible to adjust a selective small, oppositely-directed tilt of cartridge 11 and blade 3 in the circumferential direction during the welding operation, for instance by geometric shifting of the zero point of the higher actuator pairs relative to the lower actuator pairs, so that the exact desired blade orientation results at the end of the welding operation. Compression device 10 having piezoactuator 16 may have the same arrangement as in the previous figures.

Figure 5:
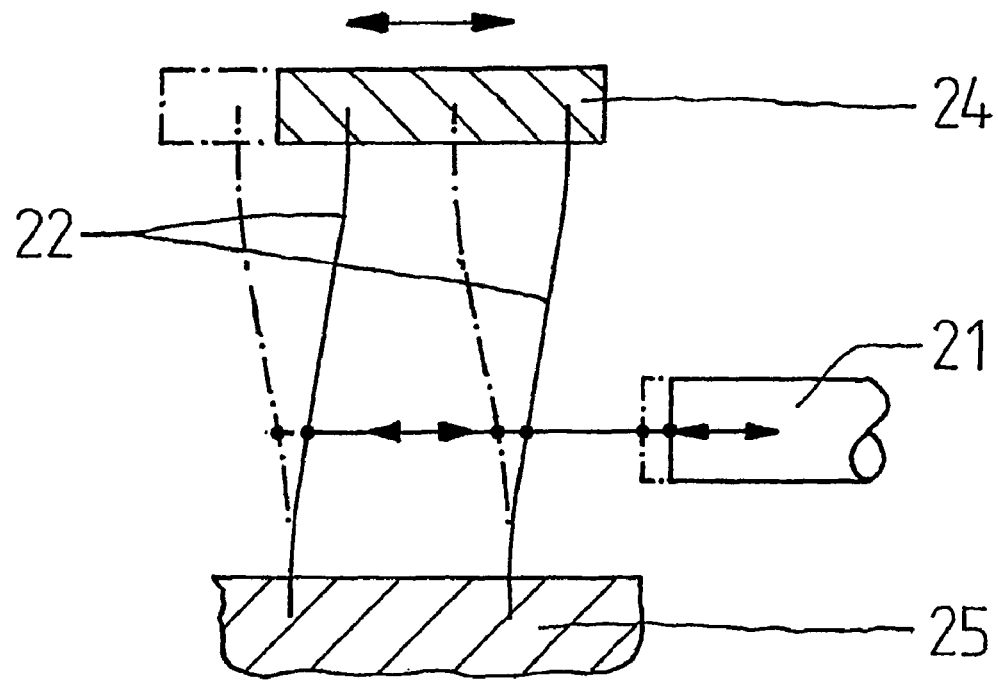
FIG. 5 illustrates the detail of a piezoactuator having a flat spring arrangement.

The movement amplitudes of piezoactuators relative to the actuator length are in the per mill range. To reduce the actuator lengths at predefined amplitudes, the actuator amplitudes may be mechanically increased, different gear mechanisms being possible. To this end, FIG. 5 illustrates a flat-spring arrangement 22 as an example. Two or more flat springs are fixedly clamped into a static base 25 at one end. The other ends of the flat springs are embedded in a displaceable part 24. A pull/pressure element connected to a piezoactuator 21 engages with the flat springs in the region between base 25 and part 24. By elastic deformation of the flat springs, part 24 is moved at a greater amplitude and the same frequency in relation to the pull/pressure element. By moving the pull/pressure element to base 25, it may be possible to increase the movement amplitude of part 24 while reducing the force exerted by part 24. The movement of part 24 may not be exactly linear since a certain swiveling motion is superposed. The kinematics closely resemble a guidance in the form of a parallelogram.

Figure 6:
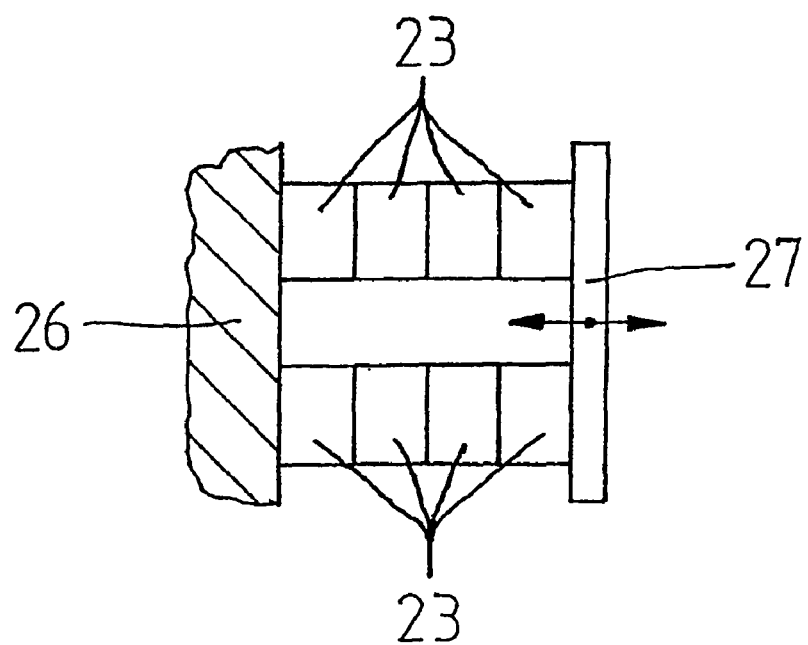
FIG. 6 illustrates an arrangement of piezo elements.

As already mentioned, piezoactuators having amplitudes in the millimeter range have a multitude of piezoelements in a geometrical series connection. It is possible that several hundred such piezoelements may be present. Since conventional piezoelements may be restricted in cross-section, for instance to the size of a coin, for the generation of great forces it may be required that a plurality of "columns" of piezoelements connected in series may need to be arranged in parallel and be combined in a, for instance, tubular actuator. FIG. 6, in highly simplified form, illustrates two "columns" arranged in parallel on a statical base 26. The two columns lead to a displaceable yoke 27 which has the same movement amplitude as each of the columns, at twice the compressive force compared to a single column. More than two collimated "columns" may be combined in one actuator. The geometrical/constructive serial or parallel connection should not be confused with the electrical circuit of the piezoelements where electrical serial and parallel connections are used as well, the latter especially for the purpose of limiting voltages.

What is claimed is:

1. A friction-welding device for integrally joining components, each component including a welding surface, comprising:
    an oscillator adapted to generate a defined periodic movement of one of the components and the welding surface of the one of the components relative to another one of the components that is held statically during welding and to the welding surface of the another one of the components, the period movement including directions of movement parallel to the welding surfaces;
    a compression device adapted to press the welding surfaces of the one of the components and the another one of the components against each other at a defined force; and
    a cartridge adapted to accommodate the one of the components outside of a welding zone;
    wherein the oscillator includes an even number of piezoactuators arranged in pairs at least approximately on a line of application, the piezoactuators prestressable with respect to the cartridge under pressure generation from opposite sides by piezoelectric liner deformation, the piezoactuators displaceable with the cartridge and the one of the components synchronously oscillatingly at cartridge-side ends.

2. The friction-welding device according to claim 1, wherein the components include hydraulically effective blades having one of (a) disk- and (b) ring-shaped blade carriers.

3. The friction-welding device according to claim 1, wherein the friction-welding device is adapted to produce and repair integrally bladed rotor components of turbo machines.

4. The friction-welding device according to claim 1, wherein the compression device includes at least one piezoactuator having a piezoelectrically movable end couplable to the cartridge to introduce a defined compression force perpendicular to the welding surfaces.

5. The friction-welding device according to claim 1, further comprising a device adapted to enlarge relatively small, linear motions of the piezoactuators to generate greater movements having at least one of (a) straight and (b) curved paths.

6. The friction-welding device according to claim 1, wherein the device includes at least one of (a) a mechanical gear, (b) a lever mechanism, (c) a flat spring arrangement, (d) a cam gear and (e) a crank control.

7. A friction-welding device for integrally joining components, each component including a welding surface, comprising:
    an oscillator adapted to generate a defined periodic movement of one of the components and the welding surface of the one of the components relative to another one of the components that is held statically during welding and to the welding surface of the another one of the components, the period movement including directions of movement parallel to the welding surfaces;
    a compression device adapted to press the welding surfaces of the one of the components and the another one of the components against each other at a defined force; and
    a cartridge adapted to accommodate the one of the components outside of a welding zone;
    wherein the oscillator includes an even number of piezoactuators arranged in pairs at least approximately on a line of application, the piezoactuators prestressable with respect to the cartridge under pressure generation from opposite sides by piezoelectric liner deformation, the piezoactuators displaceable with the cartridge and the one of the components synchronously oscillatingly at cartridge-side ends;
    wherein the friction-welding device is adapted to join blades to one of (a) a disk- and (b) a ring-shaped blade carrier, lines of application of the piezoactuators extending transversely to a longitudinal center axis of the blade carrier, a first pair of piezoactuators engaging with a front end of the cartridge from opposite sides on a line of application axially in front of the blade, a second pair of piezoactuators engaging with a rear end of the cartridge from opposite sides on a line of application axially behind the blade.

8. The friction-welding device according to claim 1, wherein the friction-welding device is adapted to join blades to one of (a) a disk- and (b) a ring-shaped blade carrier, lines of application of the piezoactuators extending transversely to a longitudinal center axis of the blade carrier, two first pairs of piezoactuators, each arranged on a line of application, engaging with a front end of the cartridge from opposite sides, axially in front of the blade at different radial heights relative to the longitudinal center axis of the blade carrier, two second pairs of piezoactuators, each arranged on a line of application, engaging with a rear end of the cartridge from opposite sides, axially behind the blade, at different radial heights relative to the longitudinal center axis of the blade carrier.

9. The friction-welding device according to claim 7, wherein at least one pair of piezoactuators engaging with the axially front end of the cartridge are moveable in relation to at least one pair of piezoactuators engaging with the axially rear end of the cartridge, are movable at a same frequency, with one of (a) a same and (b) a different amplitude and in one of (a) an in-phase and (b) a phase-shifted manner.

10. The friction-welding device according to claim 8, wherein geometrical zero points of the oscillation movements of the first pairs of piezoactuators are displaceable relative to one another, geometrical zero points of the oscillation movements of the second pairs of piezoactuators displaceable relative to one another.

11. The friction-welding device according to claim 1, wherein a force/path characteristic of the piezoactuators is selected by geometrical serial and parallel connection of piezoelements.

12. The friction-welding device according to claim 1, wherein a maximum required electrical voltage of the piezoactuators is limited by electrical serial and parallel connection of piezoelements.

* * * * *